United States Patent [19]
Casey et al.

[11] 3,890,283
[45] June 17, 1975

[54] PROCESS FOR POST-POLYMERIZING POLYGLYCOLIC ACID

[75] Inventors: Donald James Casey, Ridgefield; Martin Epstein, Norwalk, both of Conn.

[73] Assignee: American Cyanamid Company, Stamford, Conn.

[22] Filed: June 4, 1973

[21] Appl. No.: 367,043

[52] U.S. Cl. .................................... 260/78.3 R
[51] Int. Cl. C08g 17/017; C08g 53/00; C08g 53/20
[58] Field of Search ............................... 260/78.3 R

[56] References Cited
UNITED STATES PATENTS

| | | | |
|---|---|---|---|
| 3,390,134 | 1/1968 | Kibler | 260/75 |
| 3,422,181 | 1/1969 | Chirgwin | 264/345 |
| 3,621,003 | 11/1971 | Selman | 260/78.3 |
| 3,626,948 | 12/1971 | Glick et al. | 128/335.5 |
| 3,634,359 | 1/1972 | Breitschaft et al. | 260/75 M |
| 3,718,621 | 2/1973 | Wilson | 260/75 M |
| 3,772,420 | 11/1973 | Glick et al. | 264/102 |

*Primary Examiner*—Morris Liebman
*Assistant Examiner*—E. A. Nielsen
*Attorney, Agent, or Firm*—James T. Dunn

[57] ABSTRACT

A process for producing ultra high molecular weight polyglycolic acid comprising subjecting polyglycolic acid of conventional molecular weight to a prolonged heat treatment under vacuum.

5 Claims, No Drawings

PROCESS FOR POST-POLYMERIZING POLYGLYCOLIC ACID

BACKGROUND OF THE INVENTION

Glycolic acid or its cyclic dimer, glycolide, may be polymerized to produce a polymer that can be converted into a shaped form such as a filament or a film, including self-supporting films, which can be sterilized and utilized as a prosthetic device such as a suture and particularly in filament form, the filaments can be braided to produce a suture which is useful for surgical purposes when in a sterilized condition. When used as a suture, the filaments should have good straight pull strength and good knot strength prior to actual use in order that the surgeon in using such a suture material may be able to close a wound effectively with a suture material having good tensile strength. It is important that the suture material thus produced have good straight pull retention for a sufficient period of time after implantation in living tissue so as to retain its straight pull strength for a period of about 15 days or more in order to enable the wound to heal properly. There appears to be a very definite correlation between the tensile strength of the polyglycolic acid filaments and the molecular weight of the polyglycolic acid. Low molecular weight materials are not generally useful in the suture field because they generally lack the measure of tensile strength required of a suture material. It is, therefore, desirable, as a rule, to produce a polymeric material that has a very high or ultra high molecular weight in order to have the tensile strength required for the ultimate use of the filaments. The expression "polyglycolic acid" as used herein refers to that polymer that is produced from either glycolic acid or from its cyclic dimer, the glycolide composition.

FIELD OF THE INVENTION

The present invention is in the field of producing an ultra high molecular weight polymer of glycolic acid which can be converted into shaped forms and more particularly into filaments having significantly enhanced tensile strength in both the straight pull strength and in the knot pull strength. Still further, this invention is in the field of processing conventional molecular weight polyglycolic acids in a solid state post-polymerization treatment over a prolonged period of time at elevated temperatures and at an absolute pressure of about 0.1 mm. to 1.0 mm. of mercury. The process of the present invention produces ultra high molecular weight polymer from which one can fabricate objects with very high tensile strength. The ultra high molecular weight polyglycolic acid materials produced by the process of the present invention in addition to being useful in shaped forms such as filaments and films may be used to produce surgically useful solid prostheses such as reinforcing pins, screws, plates or cylinders. On implantation, in living mammalian tissue, these polyglycolic acid materials are absorbed and replaced by living tissue. These polyglycolic acid materials retain a high proportion of their original strength for at least 15 days when imbedded in living muscular tissue but frequently will retain a high proportion of their original strength for more than 15 days when imbedded in living muscular tissue but are substantially completely absorbed in 90 days. The U.S. Pat. No. 3.297,033 which issued on Jan. 10, 1967 discloses many of these characteristics. This patent is incorporated herein by reference.

DESCRIPTION OF THE PRIOR ART

The most pertinent prior art presently known to the instant applicants are the U.S. Pat. Nos. 3,422,181, and 3,626,948. The former reference shows the heat treatment of polyglycolic acid at atmospheric pressure whereas the latter shows the heat treatment of polyglycolic acid under subatmospheric pressure but neither of these references discloses a very prolonged heat treating time which results in the production of ultra high molecular weight polyglycolic acid. Each of these U.S. patents are incorporated herein by reference.

SUMMARY OF THE INVENTION

This invention relates to a process for producing ultra high molecular weight polyglycolic acid comprising heating polyglycolic acid of conventional molecular weight in a solid state at a temperature between about 150°C. and 220°C. for a period of at least 4 days at an absolute pressure between about 0.1 mm. and 1.0 mm. of mercury. It is preferred to use a temperature maintained at about 190°C. to about 200°C. A further preferred embodiment is to utilize the polyglycolic acid of conventional molecular weight in pellet form.

The starting material used in the practice of the process of the present invention is polyglycolic acid of conventional molecular weight. This polyglycolic acid can be prepared from either glycolic acid or its cyclic dimer, glycolide. The process for preparing such a polymeric material is shown in the U.S. Pat. No. 3,442,871. This U.S. patent is incorporated herein by reference. It is preferred to make use of the cyclic dimer, namely the glycolide, and more particularly a substantially pure glycolide composition. Either the α-glycolide or the β-glycolide may be used. The α-glycolide and a method for its isolation are shown in the U.S. Pat. No. 3,457,280. The method for preparation of the isomerically pure β-glycolide is shown in the U.S. Pat. No. 3,435,008. Each of these glycolide patents is incorporated herein by reference. It has been mentioned hereinabove that it is preferred to start the polymerization of the polyglycolic acid with a substantially pure glycolide composition. One process for preparing substantially pure glycolide is shown in the U.S. Pat. No. 3,597,450. This U.S. patent is also incorporated herein by reference. The polyglycolide compositions may be used as a basis to establish a relationship between the inherent viscosity measured on a given sample and the weight average molecular weight determined by light scattering on said sample. To measure the inherent viscosity of a particular polymeric glycolide, the polymeric material is dissolved in a solvent such as hexafluoroacetone sesquihydrate to form a 0.5% solution and flow times are measured at 30°C. for both solvent and solution. To illustrate this relationship between inherent viscosity and molecular weight, a linear polyglycolide, having an inherent viscosity of 0.7, would have a weight average molecular weight of about 31,000. Other comparisons of the inherent viscosities with the weight average molecular weights are set forth hereinbelow:

| Inherent Viscosities | Weight Average Molecular Weight |
| --- | --- |
| 0.8 | 38,500 |
| 0.9 | 47,000 |
| 1.0 | 56,000 |

These inherent viscosities and their corresponding weight average molecular weights are considered to be the conventional molecular weights of polyglycolic acid as produced by the U.S. Pat. No. 3,442,871. After the process of the present invention has been carried out, the inherent viscosities of the solid state post-polymerized polyglycolic acid is between about 1.4 and 2.15 which would reflect a weight average molecular weight between about 100,000 and 210,000, respectively.

The polyglycolic acid, of conventional molecular weight, is prepared by inserting a quantity of a substantially pure glycolide composition in a sealed vessel in the presence of a catalytic material and after the contents of the sealed vessel are heated at about 222°C. for about 60 minutes, the vessel is opened and the polymer is removed and ground to a particle size of about less than 20 mesh. This is a convenient particle size although larger or smaller particles may be used in practicing the process of the present invention. It is preferred to use conventional polyglycolic acid pellets of a size of about one-sixteenth inch by about three-sixteenth inch and having an inherent viscosity of about 1.1.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claim.

EXAMPLE 1

Into three stainless steel trays measuring 8 × 14½ inches there were introduced equal parts of 2,330 parts of conventional molecular weight polyglycolic acid having a pellet size of about one-sixteenth inch by about three-sixteenth inch and having an inherent viscosity of 1.17 as measured on a 0.5% solution in hexafluoroacetone sesquihydrate at 30°C. The loaded stainless steel trays were charged into a vacuum oven and heated at 190°–195°C. for 11 days at an absolute pressure of 0.5 mm. of mercury. At the end of the heating period, the resulting polymeric product, obtained in 95% yield, had an inherent viscosity of 1.42 when measured on a 0.5% solution in hexafluoroacetone sesquihydrate. The polymer was readily melt spun and drawn to form a fiber with a T/E: 9 gpd/20% (tenacity, gpd/elongation, %). This would indicate an improvement in the weight average molecular weight from about 73,000 in the starting material to over 100,000 in the finally treated product.

This increase in the molecular weight of conventional quality polyglycolic acid to an exceptionally high molecular weight range is accomplished without the use of chemical additives. Conventional chemical techniques for the direct polymerization of glycolide to polyglycolic acid can be adjusted to produce polymer with an inherent viscosity in hexafluoroacetone sesquihydrate of about 1.00 to 1.15. It is known that the molecular weight of polyglycolic acid can be enhanced by making use of an initiator or an accelerator wherein the polyglycolic acid composition contains a reactive content or a chemically combined content of such an initiator or accelerator. The U.S. Pat. No. 3,442,871 makes use of small quantities, in the order of magnitude of about 0.05 to about 1.5 mole percent based on the total number of moles of the glycolide composition to be polymerized, of an alcohol devoid of any reactive groups other than alcoholic hydroxy groups. For chemical modification the lauryl alcohol has been the preferred initiator or accelerator.

We have also discovered that a small quantity of inositol may be used as an initiator or accelerator in the polymerization of a substantially pure glycolide composition to produce polyglycolic acid of an enhanced molecular weight. In this instance, however, the improvement in molecular weight is due to the use of the chemical additives. This concept is shown in our co-pending application having the Ser. No. 356,977 filed on or about May 3, 1973. This co-pending application is incorporated herein by reference.

The conventional, lauryl alcohol modified polyglycolic acid can be spun into fibers having representative tensile properties of T/E: 6.6 gpd/32%. Variations in the amount of the polymerization catalyst such as the $SnCl_2 \cdot 2H_2O$ and molecular weight regulator, namely lauryl alcohol, are moderately effective in improving the polymer molecular weight. However, solid-state post-polymerization of such a conventional polymer produces very high molecular weight such as one having an inherent viscosity in the order of magnitude of about 1.4 which can then be converted to fiber with exceptionally high tensile properties such as T/E: 9 gpd/20%. This range of polyglycolic acid molecular weight is not readily accessible by known polymerization techniques involving the direct conversion of glycolide or glycolic acid to polymer.

The heating time for the process of the present invention should be at least 4 days under the temperature and pressure conditions recited. Longer periods of time obviously produce enhanced results such as in Example 1 when the heating period was 11 days. Even longer periods of time may be used in the practice of the process of the present invention such as 15 days, 20 days, 25 days and 28 days. After an exceedingly prolonged heating time, however, the enhancement in the molecular weight properties begins to level off so that nothing of great additional significance is to be accomplished by heating beyond about 30 days. After about 13 days of the heating step under the stated conditions of temperature and pressure an inherent viscosity of about 2.14 was measured on a 0.5% solution of the polymeric material in hexafluoroacetone sesquihydrate at 30°C.

It has been indicated hereinabove that it is preferred to use as a starting material the polyglycolic acid in pellet form. After the pellets have been subjected to this prolonged heat treatment, they may then be converted by spinning through one or more orifices of a spinnerette using the pellets in a melt so as to provide a filamentary material particularly useful as a synthetic absorbable suture material. One could apply the procedure of the present invention to a braid composed of a plurality of filaments. However, this approach is not desirable inasmuch as the prolonged heat treatment destroys the tensile properties of the braid. The heat treatment, nevertheless does enhance the molecular weight of the braided material and it could be remelted and respun through the orifices of a spinnerette so as to provide a filamentary material with the desirable tensile strength as well as the elevated molecular weight characteristic.

These additional examples are illustrative of a plurality of the facets of the present invention.

EXAMPLES 11-15 INCLUSIVE

In these examples the temperature is held constant at about 185°-200°C. at an absolute pressure of less than about 0.2 mm. of mercury. The variables are the parts by weight, the initial inherent viscosities, and the heating time in days. The results of these individual runs are shown in Table 2 set forth hereinbelow.

TABLE II

| Ex. | Parts | Initial Inherent Viscosity | Inherent Viscosities After the Indicated Days of Post-Polymerization | | | | | | |
|---|---|---|---|---|---|---|---|---|---|
| | | | 6 | 7 | 9 | 11 | 13 | 14 | 19 | 25 |
| 11 | 1360 | 1.14 | 1.40 | | | | | | 1.59 | 1.68 |
| 12 | 1810 | 1.08 | | 1.37 | 1.42 | | | | | |
| 13 | 2265 | 1.09 | | | | | | | | 1.71 |
| 14 | 2035 | 1.17 | | | | | | 1.43 | | |
| 15 | 2265 | 1.17 | | | | 1.29 | 1.38 | | | |

EXAMPLE 2

Into a suitable container as in Example 1 there was introduced about 25 parts of a pre-dried polyglycolic acid having an inherent viscosity of 1.02. The container was heated at 185°C. at an absolute pressure of less than 1 mm. of mercury. The heating was continued for 8 days whereupon a sample was removed and the inherent viscosity was found to be 1.23 when measured at 30°C. on a 0.5% solution of the polymer in hexafluoroacetone sesquihydrate.

The heating was continued for an additional 7 days under the same conditions and thereafter a sample was removed and found to have an inherent viscosity of 1.44 at 30°C. and a 0.5% concentration in hexafluoroacetone sesquihydrate.

EXAMPLE 3

Example 2 is repeated in all essential details except that the initial inherent viscosity of the starting polymer was 1.09. After 8 days the inherent viscosity had increased to 1.33 and after 15 days total, the inherent viscosity was 1.50.

EXAMPLES 4-10 INCLUSIVE

A supply of polyglycolic acid having an initial inherent viscosity of 1.21 was divided into 7 separate but substantially equal quantities amounting to about 25 parts each. These portions were placed in individual containers and then were subjected to varying heat treatments for varying periods of time under an absolute pressure of about 0.25 mm. of mercury. The temperatures to which these samples were separately subjected and the period of time during which they were subjected to these temperature treatments and the inherent viscosity after that period of time are set forth in the table hereinbelow.

It has been stressed hereinabove that exceedingly low absolute pressure is mandatory in carrying out the process of the present invention of heat treatment of the polyglycolic acid for prolonged periods of time in order to enhance the molecular weight as is reflected in the final inherent viscosity. In order to illustrate the criticality of the low pressure or high vacuum, a plurality of experiments were conducted in which each of the four predried polyglycolic acids samples of equal parts by weight having an inherent viscosity of 1.22 was heated for a period of 5 days at 205°C. but in each instance at a different pressure level. The effect of the operating pressure on the inherent viscosities of the resultant polymeric product is indicated in the table hereinbelow:

TABLE III

| Operating Pressure | Final $\eta_{inh}$ |
|---|---|
| 0.1 mm. | 1.59 |
| 10 mm. | 1.09 |
| 30 mm. | 0.82 |
| ~760 mm. | 0.55 |

It is evident from these data that a very low pressure (high vacuum) is essential to effect an increase in the molecular weight of the polyglycolic acid under the static bed operating conditions employed in this process. It can be seen that pressures significantly above 1.0 mm. of mercury up to atmospheric pressure have in fact produced a decrease in the polymer molecular weight.

We claim:

1. A process for increasing the molecular weight of polyglycolic acid comprising heating said polyglycolic acid in a solid state at a temperature between about 150°C. and 220°C. for a period of time of at least 4 days at an absolute pressure between about 0.1 mm. and 1.0 mm. of mercury.

TABLE I

| Ex. | Temp. | Inherent Viscosity After the Indicated Days of Post-Polymerization | | | | | | |
|---|---|---|---|---|---|---|---|---|
| | | 4 | 5 | 11 | 13 | 18 | 25 | 32 |
| 4 | 150°C. | | 1.17 | 1.20 | | | | |
| 5 | 175°C. | | 1.23 | 1.33 | | | | |
| 6 | 190°C. | 1.47 | | 1.67 | | | | |
| 7 | 200°C. | | 1.60 | 1.72 | | 1.82 | 1.94 | 1.97 |
| 8 | 206°C. | | 1.59 | | 1.80 | | | |
| 9 | 210°C. | 1.77 | | | | | | |
| 10 | 212°C. | | 1.74 | | 2.14 | | | |

2. A process according to claim 1 in which the polyglycolic acid is in pellet form.

3. The process according to claim 1 in which the temperature is maintained at about 190° to 200°C.

4. The process according to claim 3 in which the polyglycolic acid is in pellet form.

5. The process according to claim 1 in which the polyglycolic acid being heated contains as a molecular weight regulator a reactive content or chemically combined content of from about 0.05 to about 1.5 mole percent of an alcohol devoid of any reactive groups other than alcoholic hydroxy groups.

* * * * *